C. T. LEACH & G. W. CANFIELD.
STARTING DEVICE.
APPLICATION FILED APR. 20, 1911.
1,013,027.
Patented Dec. 26, 1911.
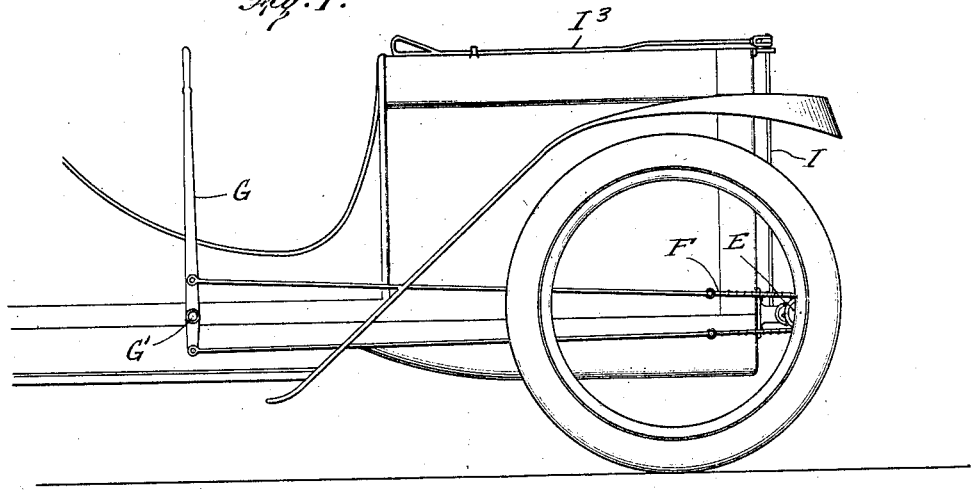
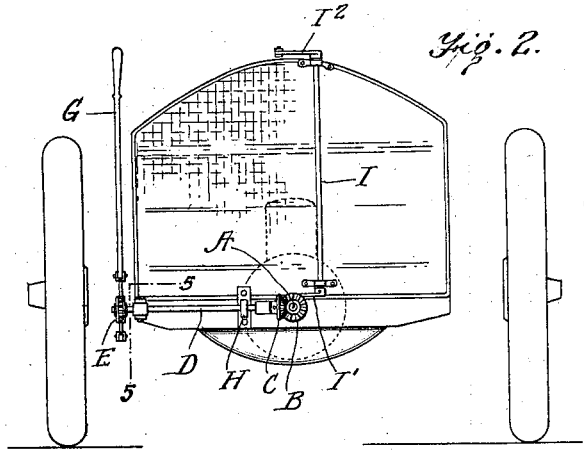
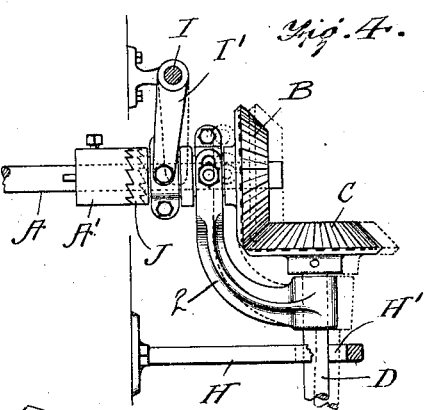
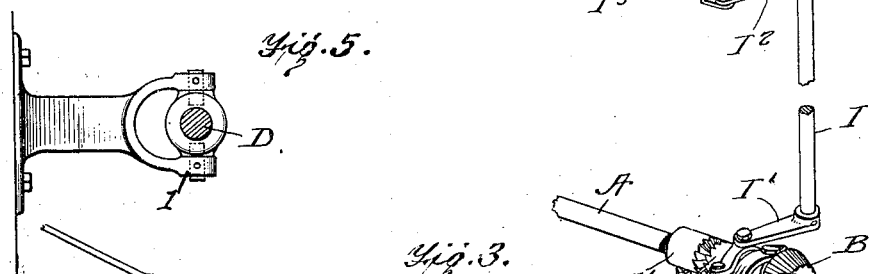
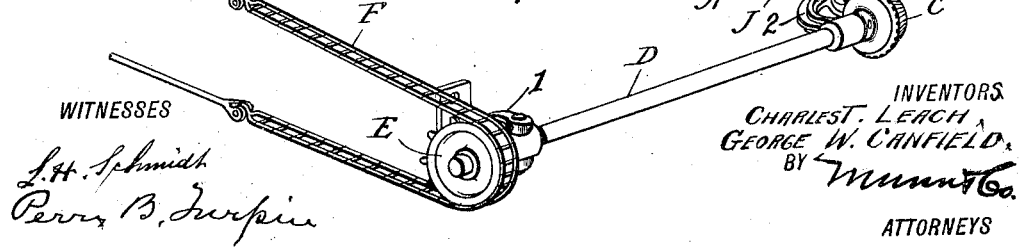
WITNESSES
INVENTORS
CHARLES T. LEACH,
GEORGE W. CANFIELD,
BY
ATTORNEYS

UNITED STATES PATENT OFFICE.

CHARLES THOMAS LEACH AND GEORGE WASHINGTON CANFIELD, OF YALE, OKLAHOMA.

STARTING DEVICE.

,013,027.

Specification of Letters Patent. Patented Dec. 26, 1911.

Application filed April 20, 1911. Serial No. 622,196.

*To all whom it may concern:*

Be it known that we, CHARLES T. LEACH and GEORGE W. CANFIELD, citizens of the United States, and residents of Yale, in the county of Payne and State of Oklahoma, have invented certain new and useful Improvements in Starting Devices, of which the following is a specification.

This invention is an improvement in starting devices for use on automobiles; and the invention consists in certain novel constructions and combinations of parts as will be hereinafter described and claimed.

In the drawing Figure 1 is a side view of the front portion of an automobile, parts being removed, with the improvements applied. Fig. 2 is a front elevation of an automobile, parts being removed, showing the improvements. Fig. 3 is a detail perspective view showing some of the operating mechanism. Fig. 4 is a detail plan view of the gears of the engine and starting shafts and the parts immediately associated therewith. Fig. 5 shows the rocking bearing.

In the construction shown, the engine shaft A has a beveled gear B which is meshed by a beveled gear C on the starting shaft D. This starting shaft D has the beveled gear C at its inner end and at its outer end is provided with a sprocket wheel E meshed by a chain F, whose opposite ends are connected with the starting lever G on opposite sides of the pivot G' of the said lever, so that the lever G may be rocked to turn the sprocket wheel E and shaft D through the medium of the sprocket chain F so that by means of the lever G the starting shaft D may be turned to operate the engine shaft when the parts are properly geared up in the operation of the invention.

Means are provided for throwing the shaft D into and out of gear with the engine shaft A so that when the shafts D and A are geared together the engine shaft may be operated to secure a starting of the engine by the rocking of the lever G. In carrying out this feature of the invention, the bearing bracket H has a horizontal slot H' in which the shaft D is supported so that the inner end of the shaft may be thrown forward and back when the shaft is rocked on the bearing 1 in order to move the gear C and the gear B which are both journaled in and connected by a bracket 2 to a position in which the gear B is unclutched from the shaft A. This is accomplished by the crank I' on the lower end of the upright shaft I, which shaft I has at its upper end a crank I² to which the handle rod I³ leading into convenient reach of the operator is connected.

The crank I' connects with the yoke on the clutch section J, which section J is loose on and movable longitudinally along the shaft A back into the position shown in full lines in Fig. 4, in which it engages with the clutch section A' on the shaft A, or forwardly as indicated in dotted lines, Fig. 4, to free the gear B from turning with the shaft A. In the operation of this construction, when the shaft I is rocked to the position shown in Fig. 3, it will throw the clutch section J out of engagement with the clutch section A' and will also move the gears B and C forwardly to the position shown in dotted lines in Fig. 4. When the parts are in the full line position, Fig. 4, the lever G may be operated to turn the shaft D and the gear C in such manner as to turn the gear B to give the starting motion to the engine shaft.

The construction is simple, easily operated and efficiently serves the purpose for which it is designed.

We claim:

1. The combination, substantially as herein described, of the engine shaft, a gear wheel thereon and movable along the engine shaft and provided with a clutch section, a clutch section on the engine shaft for coöperation with that of the gear wheel, a starting shaft provided at its inner end with a gear meshing with that of the engine shaft, a rocking bearing for the outer end of the starting shaft, a bearing bracket having a horizontal slot guiding the inner end of the starting shaft, a bracket having bearings for the starting shaft and for the hub of the gear on the engine shaft, a shaft having a crank for operating the clutch section of the gear, means for operating said crank shaft, a sprocket wheel on the starting shaft, an operating lever, and a chain meshing with the sprocket wheel and connected with the lever, substantially as set forth.

2. The combination of an engine shaft, a gear wheel movable along the engine shaft and provided with a clutch section, a clutch section on the shaft coöperating with that of the gear wheel, a starting shaft provided with a gear meshing with that of the engine shaft, a bracket having bearings for the starting shaft and for the hub of the engine shaft gear, a rocking bearing for the outer end of the starting shaft and a bracket having a slotted bearing for the inner end of the starting shaft, means operating the clutch section of the engine shaft gear and means for operating the starting shaft, all substantially as and for the purposes set forth.

CHARLES THOMAS LEACH.
GEORGE WASHINGTON CANFIELD.

Witnesses:
R. E. MOORE,
T. H. CUNNINGHAM.

Copies of this patent may be obtained for five cents each, by addressing the "Commissioner of Patents, Washington, D. C."